Figure 1:
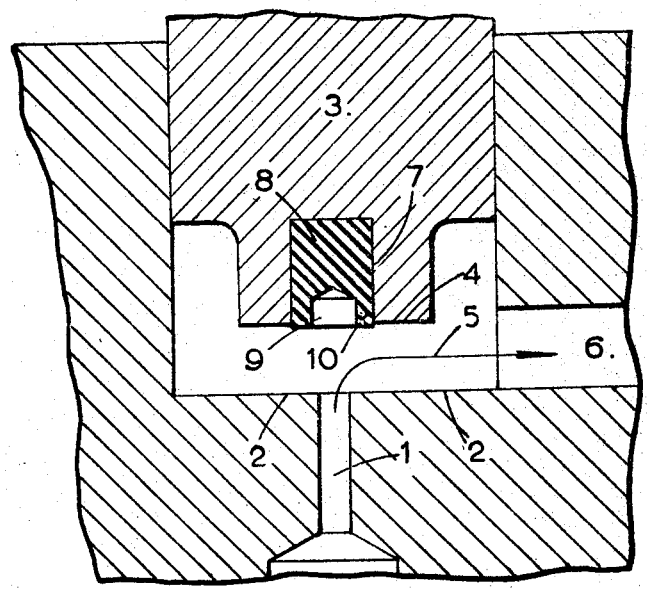

Aug. 9, 1966    O. H. VARGA    3,265,353

SEALING MEANS FOR VALVES

Filed April 25, 1963

INVENTOR
*Otto Herman Varga*

BY
*Shoemaker and Mattare*

ATTORNEYS

United States Patent Office 3,265,353
Patented August 9, 1966

3,265,353
SEALING MEANS FOR VALVES
Otto H. Varga, Bradford-on-Avon, England, assignor to
Seetru Limited, Bristol, England, a British company
Filed Apr. 25, 1963, Ser. No. 275,591
3 Claims. (Cl. 251—175)

In patent specification No. 3,053,501, I have described valve arrangements employing hydrostatic type sealing rings of rubber or rubber-like material. Such rings are of general P-section; that is they have a main body portion of general D-section with a peripherally continuous lip projecting from the main body portion. Such rings perform the same hydrostatic action as is performed by the well-konwn O-rings with the important exception that the peripherally continuous lip, which is intergal with the main body portion of the ring, assists in the location of the ring in its groove and extends the range of use of the rings. The sealing action of such lipped rings is fully described in the aforementioned specification.

The purpose of this invention is to provide an improved form of seal for small bore valves particularly relief valves and float operated valves of the kind where a valve closure member, usually a cylindrical plunger, abuts or moves into close proximity with the valve seat on closure and the valve seat has a central aperture or port through which the pressure fluid enters the valve chamber.

According to the present invention, in such a valve the valve closure member mounts a resilient sealing element having an annular rim which is arranged to surround the aperture or port when the valve closure member abuts or moves into close proximity with the seat to effect sealing therebetween, the sealing element being so shaped that it presents to the port a continuous circular surface bounded peripherally by the rim.

The valve seat may either be flat, or slightly conical or part spherical in shape and in the last two cases it may be slightly convex or slightly concave. The nose of the valve plunger is so shaped that it makes metal-to-metal contact with the valve seat at some small radial distance from the edges of the fluid aperture.

The present invention is of particular value in small valves and it is also of particular value in ball valves for domestic cisterns where it can with great advantage replace the conventional rubber disc seals which are notorious for the fact that they become cut and distorted by the pressure of the valve nozzle and they thus have a very short useful life. The hydrostatic rubber disc seal according to the present invention will not be cut, or distorted by the valve seat ring and is, in fact, subject to no wear, abrasion or other usage, and performs its sealing action by virtue of the self-sealing properties of the rubber rim. It will, therefore, have a useful life many times the life of the conventional rubber disc valve used, e.g., in ball cisterns.

The valve element according to this invention is also very useful for high pressure relief valves in hydrostatic systems for aircraft and other mechanisms which all consist of essentially small bore pipe arrangements.

For special servies the metallic, i.e., non-rubber components of the valve may also be executed in hard plastic materials, e.g., polytetrafluoroethylene.

For obturating extermely small valve bores or ports of the order of 0.05" diameter or less, the invention provides a further embodiment in which the sealing element comprises a cylindrical plug of rubber or like resilient material occupying a cylindrical cavity in the valve closure member, said plug having at its end near the port an axial cavity, the remainder of the plug forming a sidewall and a closed base for the cavity, the resilient sidewall of said cavity constituting the annular rim of the sealing element, and said rim being preferably flush with or standing proud from the valve closure member when the latter is disengaged from the seat.

In these small sizes it is not possible to mould the rubber seals in the usual manner used in the production of rubber or plastic components, and the rubber element of the seal is therefore produced by means of a mechanical drilling operation. In its simplest form a small cylindrical piece of rubber is inserted into a suitably formed socket in the valve plunger, the outside diameter of the rubber element exceeding the diameter of the hole which has to be obturated by say, 0.04". When thus fitted to the plunger, a blind hole is drilled in the centre of the rubber element, approximately equal in diameter to the hole to be sealed, and extending to a depth of say, 0.02" to 0.04". This drilling operation is carried out with a high-speed metal drill, and when complete, the rubber will be in the form of a right circular cylinder with a blind central hole extending from one side. Thus a rim is formed in the rubber element which performs the same function as the moulded rims in the seals previously described.

When the valve is closed, the plunger will bear on the valve seat and the rim of the rubber seal will make contact with the valve seat over an annulus immediately surrounding the valve aperture. Fluid pressure when issuing from the small hole of the valve seat will be able to enter the blind hole in the rubber sealing element, and there set up a fluid pressure directed radially outwards against the walls of the rim previously formed. This radial pressure will again bring about the so-called hydrostatic sealing action of the rim of the rubber seal which will press against the valve seat with a pressure substantially equal to the fluid pressure applied inside the sealing element, and thus leakage radially outwards from the obturated hole will be effectively prevented so long as the plunger makes contact with the valve seat. The rim of the rubber seal is preferably flush, or slightly proud, (0.002" to 0.006") above the face of the plunger surrounding the sealing element, and the plunger being of metal or a hard plastic material. This will ensure that when the plunger face makes solid contact with the valve seat, the rim of the rubber seal will also have made effective contact with the seat and will be able thus to perform its designed sealing function.

The drilling operation to produce the tiny blind hole in the rubber seal can be performed at normal temperature, but in some cases it may be preferable to freeze the rubber by the application of solid $CO_2$ or by other means, in order to render it hard enough for the fine drilling operation to be performed without difficulty.

The invention will be described with reference to the accompanying drawings in which five embodiments of valve sealing arrangements are illustrated in cross-section.

Figure 2:
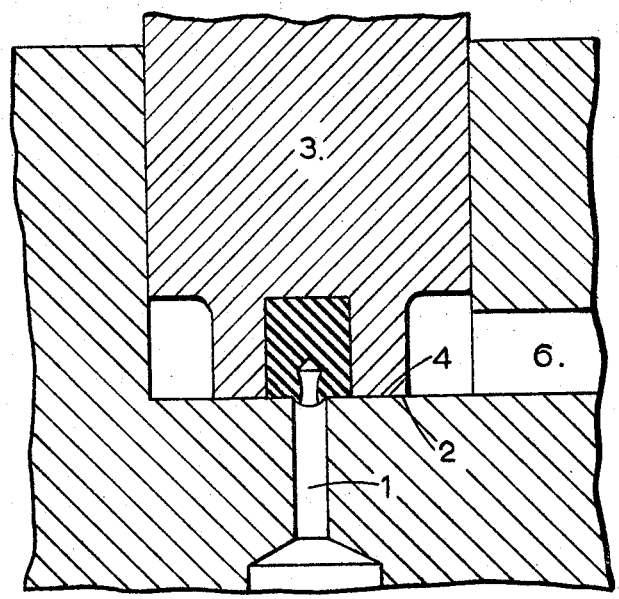

FIGURE 1 shows a first embodiment with the valve members in the valve open position, FIGURE 2 is a view of the same embodiment with the valve closed.

Referring first to FIGURES 1 and 2, the sealing device here shown is intended to close small valve holes or ports 1, of the order of 0.05" diameter or less.

2 represents a seat surrounding the mouth of the port 1 and 3 represents a valve closure member having a nose portion 4 which is adapted to be brought into contact with the seat 2 to obturate the port 1 to prevent fluid flow in the direction of arrow 5 to outlet port 6.

The nose portion 4 is substantially flat annular and is formed with a central cylindrical cavity 7. Within the cavity 7 is a cylindrical plug of resilient material whose outside diameter exceeds the diameter of the port 1.

A blind hole 9 is drilled or formed in the end face of the plug 8 and is slightly larger or approximately equal in diameter with the port 1 to be sealed. There is thus left an annular rim 10 which is either flush with, or which preferably stands proud from, the nose 4. When the member 3 is moved downwardly in FIGURES 1 and 2 to bring its nose portion 4 into contact with the seat 2 the rim 10 will engage the seat 2 and the fluid pressure originating from port 1 will urge such rim 10 firmly into engagement with the seat and with the wall of the cavity 7 to effect sealing between the nose 4 and the seat 2. By these means fluid flow to the outlet port 6 will be prevented.

The drilling operation to produce the blind hole 9 will preferably be performed by freezing the plug 8 in order to render it hard enough for such operation to be performed without difficulty.

Thus with this embodiment, when the valve closure member is moved into proximity with the seat, the resilient sealing element is formed with a rim which abuts with the seat and surrounds the mouth of a port, with the remainder of the sealing element occupying the area bounded by the rim, said sealing element thus presenting to the port a continuous although not necessarily flat surface bounded by the rim, and when pressed into firm engagement with the seat, it effects positive hydrostatic sealing between the closure member and the seat to obturate the port.

In this case the closure member may make contact with the seat although the ring will perform the same sealing action when the closure member is in close proximity with the seat, providing of course the rim actually makes contact with the seat.

I claim:

1. A valve comprising a flat, planar seat member surrounding a port of predetermined cross-section, a valve closure member positioned downstream of said port and having a planar face adapted to be brought into abutment with the planar seat when the port is to be closed, a deep recess in said planar face of said valve closure member opposite said port, a solid resilient sealing element fitting said recess, the outer face portion of said sealing element having a shallow recess therein whose cross sectional area is slightly greater than that of the said port and defining a sealing rim, and said rim when unstressed projecting beyond the planar face of said closure member, whereby upon closing the opening the projecting portion of said sealing member will flow toward the recess therein and into said port and thereby form a tight seal.

2. The valve according to claim 1 wherein the seal element comprises a cylindrical plug and wherein the depth of the recess therein is less than half the axial length of the plug.

3. A high pressure relief valve comprising a flat, planar seat member surrounding a circular port of predetermined diameter, a valve closure member positioned downstream of said port and having a planar face adapted to be brought into abutment with the planar seat when the port is to be closed, a deep cylindrical recess in said planar face of said valve closure member opposite said port, a solid resilient sealing element fitting said recess, the outer face portion of said sealing element having a shallow cylindrical recess therein whose diameter is approximately that of the said port and defining a sealing rim, and said rim when unstressed extending at least to the plane of said planar face of said closure member, whereby upon closing the opening fluid pressure enters the shallow recess and expands the sealing rim against the said planar seat and thereby forms a tight seal.

References Cited by the Examiner

UNITED STATES PATENTS

| 2,593,740 | 4/1952 | Faust | 251—357 |
| 2,654,560 | 10/1953 | Smith | 251—357 X |

FOREIGN PATENTS

| 123,121 | 1/1942 | Australia. |
| 184,911 | 1922 | Great Britain. |

M. CARY NELSON, *Primary Examiner.*

HENRY T. KLINKSIEK, *Examiner.*